(12) United States Patent
Park et al.

(10) Patent No.: US 12,116,012 B2
(45) Date of Patent: Oct. 15, 2024

(54) SYSTEM AND METHOD FOR AUTONOMOUS VEHICLE CONTROL BASED ON MONITORING DRIVER STATE

(71) Applicant: Korea Automotive Technology Institute, Cheonan-si (KR)

(72) Inventors: Sun Hong Park, Cheonan-si (KR); Young Dal Oh, Cheonan-si (KR); Jin Hae Yae, Cheonan-si (KR); Dong Woon Ryu, Cheonan-si (KR); Hun Lee, Cheonan-si (KR)

(73) Assignee: Korea Automotive Technology Institute, Cheonan-si (KR)

( * ) Notice: Subject to any disclaimer, the term of this patent is extended or adjusted under 35 U.S.C. 154(b) by 61 days.

(21) Appl. No.: 17/404,458

(22) Filed: Aug. 17, 2021

(65) Prior Publication Data

US 2022/0176996 A1 Jun. 9, 2022

(30) Foreign Application Priority Data

Dec. 7, 2020 (KR) .................. 10-2020-0169822
Dec. 7, 2020 (KR) .................. 10-2020-0169823
Dec. 7, 2020 (KR) .................. 10-2020-0169824

(51) Int. Cl.
*B60K 35/00* (2024.01)
*B60W 10/20* (2006.01)
(Continued)

(52) U.S. Cl.
CPC ......... *B60W 60/0013* (2020.02); *B60K 35/00* (2013.01); *B60W 10/20* (2013.01);
(Continued)

(58) Field of Classification Search
CPC ....... B60W 60/0013; B60W 2540/225; B60W 2540/229; B60W 2554/802; B60W 10/20;
(Continued)

(56) References Cited

U.S. PATENT DOCUMENTS

2016/0185219 A1* 6/2016 Sakata .................. G01C 21/36
701/36
2017/0135621 A1* 5/2017 Lee .......................... A61B 5/18
(Continued)

FOREIGN PATENT DOCUMENTS

JP 2018-167647 A 11/2018
JP 2019-59248 A 4/2019
(Continued)

*Primary Examiner* — Jess Whittington
*Assistant Examiner* — Rami Nabih Bedewi
(74) *Attorney, Agent, or Firm* — Sughrue Mion, PLLC

(57) ABSTRACT

Provided is a system and method for controlling a vehicle. The vehicle control system includes an input unit configured to collect driving situation data and driver's state data, a memory configured to store a program for determining a driving pattern using the driving situation data and the driver's state data in the case of an autonomous driving mode, and a processor configured to execute the program. The processor learns the driving situation data and the driver's state data to determine a driver's preferred driving pattern and transmit an autonomous driving control command according to the driving pattern.

12 Claims, 11 Drawing Sheets

(51) Int. Cl.
  *B60W 30/14* (2006.01)
  *B60W 30/16* (2020.01)
  *B60W 40/02* (2006.01)
  *B60W 40/09* (2012.01)
  *B60W 50/08* (2020.01)
  *B60W 60/00* (2020.01)
  *B60K 35/23* (2024.01)
  *B60K 35/29* (2024.01)

(52) U.S. Cl.
  CPC .......... *B60W 30/143* (2013.01); *B60W 30/16* (2013.01); *B60W 40/02* (2013.01); *B60W 40/09* (2013.01); *B60W 50/082* (2013.01); *B60K 35/23* (2024.01); *B60K 35/29* (2024.01); *B60K 2360/188* (2024.01); *B60W 2540/225* (2020.02); *B60W 2540/229* (2020.02); *B60W 2540/30* (2013.01); *B60W 2554/801* (2020.02); *B60W 2554/802* (2020.02)

(58) Field of Classification Search
  CPC .... B60W 30/143; B60W 30/16; B60W 40/02; B60W 40/09; B60W 50/082; B60W 2540/30; B60K 2370/1529; B60K 2370/188; B60K 35/00
  See application file for complete search history.

(56) References Cited

U.S. PATENT DOCUMENTS

| | | | |
|---|---|---|---|
| 2017/0187963 A1* | 6/2017 | Lee | G02B 27/01 |
| 2019/0187790 A1* | 6/2019 | Woo | G06F 3/013 |
| 2019/0202464 A1* | 7/2019 | McGill | B60W 60/0053 |
| 2019/0337521 A1* | 11/2019 | Stauber | B60W 40/08 |
| 2020/0050001 A1* | 2/2020 | Watanabe | G02B 27/0179 |
| 2020/0317053 A1* | 10/2020 | Kikuchi | G02B 27/01 |
| 2021/0157143 A1* | 5/2021 | Grundhoefer | G02B 27/0172 |
| 2022/0091415 A1* | 3/2022 | Misawa | G02B 27/0093 |
| 2022/0212670 A1* | 7/2022 | Aoki | B60W 30/16 |

FOREIGN PATENT DOCUMENTS

| | | |
|---|---|---|
| JP | 2020-138696 A | 9/2020 |
| KR | 10-2015-0087985 A | 7/2015 |
| KR | 10-2017-0053799 A | 5/2017 |
| KR | 10-2017-0057084 A | 5/2017 |
| KR | 10-2017-0059224 A | 5/2017 |
| KR | 10-2019-0097486 A | 8/2019 |
| KR | 10-2019-0134919 A | 12/2019 |
| KR | 10-2020-0011405 A | 2/2020 |
| KR | 10-2020-0040115 A | 4/2020 |
| KR | 10-2020-0082258 A | 7/2020 |

* cited by examiner

SYSTEM AND METHOD FOR AUTONOMOUS VEHICLE CONTROL BASED ON MONITORING DRIVER STATE

CROSS-REFERENCE TO RELATED APPLICATION

This application claims priority to and the benefit of Korean Patent Application No. 10-2020-0169822, filed on Dec. 7, 2020, Korean Patent Application No. 10-2020-0169823, filed on Dec. 7, 2020, Korean Patent Application No. 10-2020-0169824, filed on Dec. 7, 2020, the disclosure of which are incorporated herein by reference in their entirety.

BACKGROUND

1. Field

The present disclosure relates to a system and method for controlling a vehicle.

2. Discussion of Related Art

Vehicle driving modes may be divided into an autonomous driving mode in which a vehicle has a driving control right and a driver driving mode in which a driver has a driving control right.

In the case of an autonomous driving mode, according to the related art, a control for autonomous driving is performed in consideration of a route to a destination and surrounding conditions (obstacle information, signal information, and the like), but there is a limitation in not considering the preferences and characteristics of individual drivers in determining the autonomous driving pattern.

In the case of a driver driving mode, a head-up display (HUD) device that graphically displays a vehicle speed, a remaining fuel amount, road guidance, advanced driver-assistance system (ADAS) information, etc. on a windshield in front of a driver is applied. The HUD according to the related art does not consider a driver's gaze position (gaze point), and therefore, there is a problem in that a driver cannot recognize information displayed on the HUD depending on the situation, and the HUD cannot be controlled in consideration of a driver's condition and illumination information.

SUMMARY

The present disclosure proposed to solve the above-mentioned problems and an object of the present disclosure provide a system and method for controlling a vehicle capable of performing learning-type autonomous driving control in consideration of a driver's state, a driving history, or a pattern in an autonomous driving mode, determining a driver's face orientation and gaze to control head-up display (HUD) information to be provided at a location where a gaze point is located, supporting intuitive recognition of the HUD information even when the driver's gaze moves, reducing a driver fatigue in consideration of the driver's condition and illumination information, and controlling the HUD so that visibility of the HUD is improved.

According to an aspect of the present disclosure, there is provided a vehicle control system including an input unit configured to collect driving situation data, infrastructure data, forward situation data, and driver's state data, a memory configured to store a program for determining a driving pattern using the driving situation data and the driver's state data in a case of an autonomous driving mode, and a processor configured to execute the program, in which the processor learns the driving situation data, the infrastructure data, the forward situation data, and the driver's state data to determine a driver's preferred autonomous driving pattern, and transmit an autonomous driving control command according to the driving pattern.

The driving situation data may include speed, acceleration, yaw, pitch, and roll information and steering angle information of a vehicle.

The infrastructure data may include information on weather, a pavement condition, and a road structure.

The forward situation data may include information on whether a front vehicle is present, a color and a size of the front vehicle, whether a gaze point overlaps a head-up display (HUD) position and a lighting device of the front vehicle, and the like.

The driver's state data may include gaze direction information, eye blink information, pupil diameter information, face position information, and expression information of a driver.

The processor may perform learning by matching the autonomous driving data, the driving situation data, and the driver's state data according to time sequence, and use the learned result to transmit an autonomous driving control command according to the driver's preferred driving pattern.

The processor may include at least one of a steering wheel control command for a turning radius on a curved road, a vehicle speed control command, an acceleration control command, and a command for maintaining a separation distance from the front vehicle.

In a case of a driver driving mode, the memory may further store a second program for determining an HUD control command using the driver's state data including driver's gaze position information and the driving situation data including position and color information of a surrounding object, and the processor may execute the second program and transmit the HUD control command in consideration of the color information of the surrounding object displayed in an HUD area in the driver's gaze.

The processor may transmit a control command for changing a color of a head-up display user interface (HUD UI) to the HUD so that a color of content displayed in the HUD area is contrasted/compared with the color of the surrounding object to maximize day/night visibility/readability.

The processor may determine the gaze point using the driver's gaze position information and transmit a control command to display HUD information at the gaze point.

In a case of a driver driving mode, the memory may further store a third program for determining an HUD control command by using at least one of the driver's state data related to a driver fatigue and the driving situation data related to illuminance, and the processor may execute the third program and transmit the HUD control command for changing at least one of color, brightness, and saturation of content displayed on the HUD.

According to another aspect of the present disclosure, there is provided a vehicle control method, including (a) collecting driver's state data and driving state data, (b) in an autonomous driving mode, performing learning using autonomous driving control data, the driver's state data, and the driving state data, and determining a driver's preferred driving pattern, and (c) transmitting an autonomous driving control command according to the driving pattern.

In operation (a), the driving situation data including vehicle speed, acceleration, yaw, pitch, and roll information and steering angle information, and the driver's state data including gaze direction information, eye blink information, pupil diameter information, face position information, and expression information of a driver may be collected.

In operation (b), the driving pattern including at least one of a steering wheel control command for a turning radius on a curved road, a vehicle speed control command, an acceleration control command, and a command for maintaining a separation distance from a front vehicle may be determined.

The vehicle control method may further include, (d) when the autonomous driving mode is switched to a driver driving mode, acquiring driver's gaze position information and information on a position, a color, and luminance of a surrounding object corresponding to the position, and determining an HUD control command.

In operation (d), the color and luminance of the content displayed in an HUD area may be contrasted/compared with the color of the surrounding object in consideration of the color and luminance information of the surrounding object displayed in the HUD area in the driver's gaze and may transmit the HUD control command to maximize day/night visibility/readability.

The vehicle control method may further include (e) when the autonomous driving mode is switched to the driver driving mode, determining an HUD control command by using at least one of the driver's state data related to a driver fatigue and the driving situation data related to illuminance.

In operation (e), the HUD control command for changing at least one of color, brightness, and saturation of content displayed on the HUD may be determined.

The above-described configurations and operations of the present disclosure will become more apparent from embodiments described in detail below with reference to the drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The above-described objects and other objects of the present disclosure and methods accomplishing them will become apparent from the following description of embodiments with reference to the accompanying drawings.

However, the present disclosure is not limited to the embodiments disclosed below but may be implemented in various different forms. Only the following embodiments are provided to easily inform those of ordinary skill in the art to which the present disclosure pertains that the object, configuration and effect of the disclosure, and the scope of the present disclosure is defined by the description of the claim.

Meanwhile, terms used in the present specification are for describing the embodiments rather than limiting the present disclosure. Unless otherwise stated, a singular form includes a plural form in the present specification. Components, steps, operations, and/or elements mentioned by terms "comprise" and/or "comprising" used in the present disclosure do not exclude the existence or addition of one or more other components, steps, operations, and/or elements.

Figure 1:
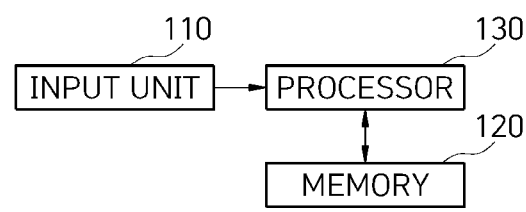
FIG. 1 illustrates a vehicle control system according to an embodiment of the present disclosure.

FIG. 1 illustrates a vehicle control system according to an embodiment of the present disclosure.

The vehicle control system according to the present disclosure includes an input unit 110 configured to collect driving situation data, driver's state data, infrastructure information, and forward situation data, a memory 120 configured to store a program for determining a driving pattern using the driving situation data and the driver's state data in the case of an autonomous driving mode, and a processor 130 configured to execute the program, in which the processor 130 learns the driving situation data and the driver's state data to determine a driver's preferred driving pattern and transmit an autonomous driving control command according to the driving pattern.

The driving situation data includes speed, acceleration, yaw, pitch, and roll information and steering angle information of a vehicle.

The driver's state data includes gaze direction information, eye blink information, pupil diameter information, face position information, and expression information of a driver.

The processor 130 performs learning by matching the autonomous driving data, the driving situation data, the driver's state data, the infrastructure information, and the forward situation data according to time sequence, and uses the learned result to transmit an autonomous driving control command according to the driver's preferred driving pattern.

The processor 130 includes at least one of a steering wheel control command for a turning radius on a curved road, a vehicle speed control command, an acceleration control command, and a command for maintaining a separation distance from the front vehicle.

In the case of a driver driving mode, the memory 120 further stores a second program for determining a head-up display (HUD) control command using the driver's state data including driver's gaze position information and the driving situation data including position and color information of a surrounding object, and the processor 130 executes the second program and transmits an HUD control command in consideration of the color information of the surrounding object displayed in an HUD area in the driver's gaze.

The processor 130 contrasts/compares a color of content displayed in the HUD area with a color of a surrounding object to transmit the HUD control command to maximize day/night visibility/readability.

For example, the color of the content displayed in the HUD area and the color of the surrounding object are set in a complementary color relationship.

The processor 130 determines the gaze point using the driver's gaze position information and transmits a control command to display HUD information at the gaze point.

In the case of a driver driving mode, the memory 120 further stores a third program for determining an HUD control command by using at least one of the driver's state data related to a driver fatigue and the driving situation data related to illuminance, and the processor 130 executes the third program and transmits the HUD control command for changing at least one of color, brightness, and saturation of content displayed on the HUD.

Hereinafter, in order to help those skilled in the art to understand, an embodiment (first embodiment) for determining a driving pattern in an autonomous driving mode, an embodiment (second embodiment) for controlling an HUD in consideration of a driver's gaze, and an embodiment (third embodiment) for controlling the HUD in consideration of a driver's condition and illuminance information will be described.

First Embodiment

Figure 2:
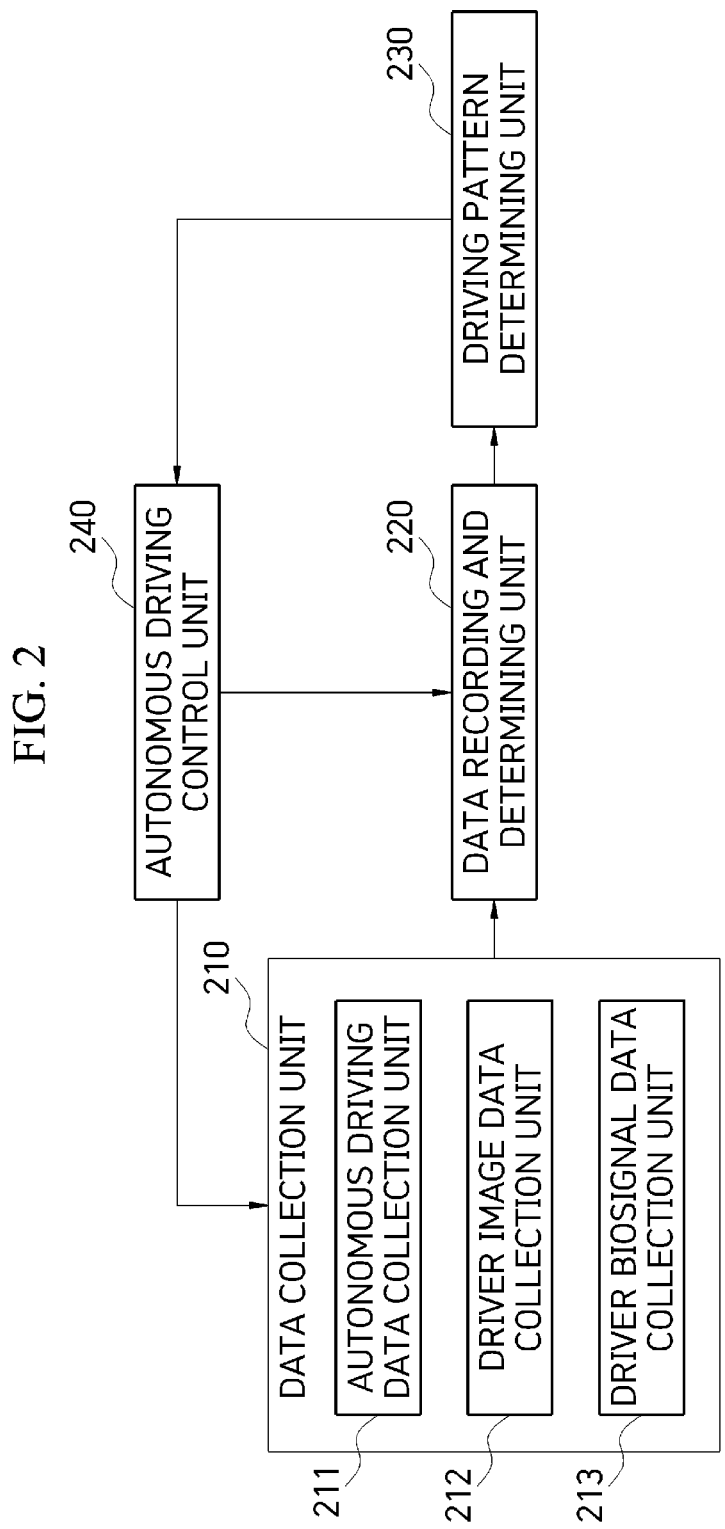
FIG. 2 illustrates a vehicle control apparatus according to an embodiment of the present disclosure.

FIG. 2 illustrates a vehicle control apparatus according to an embodiment of the present disclosure.

A vehicle control apparatus according to the embodiment of the present disclosure simultaneously acquires data such as expression, facial movement, tension, or relaxation state of a driver to determine a driver's state or emotion through a camera or biometric sensor together with vehicle behavior data (speed, acceleration, yaw, pitch, roll angle, steering angle, etc.) and longitudinal (acceleration, brake pressure command, etc.) and lateral (steering wheel angle/torque command, etc.) control data used for autonomous driving control.

According to the embodiment of the present disclosure, optimization is performed by learning the driver's state or emotion according to an autonomous driving control pattern, predicting driving control patterns desired by individual drivers based on the learned data, confirming the driver's emotion according to the predicted driving control pattern, and performing re-learning.

The vehicle control apparatus according to the embodiment of the present disclosure includes a data collection unit 210 that collects vehicle data and driver data, a data recording and determining unit 220 that stores the collected data and determines the driver's state, a driving pattern determining unit 230 that learns data and predicts a driver's preferred driving pattern, and an autonomous driving control unit 240 that performs autonomous driving according to the driving pattern.

The data collection unit 210 includes an autonomous driving data collection unit 211 and a driver image data collection unit 212 and a driver biosignal data collection unit 213.

The autonomous driving data collection unit 211 collects, as vehicle data, information such as speed, acceleration, a yaw/pitch/roll angle, and a steering angle acquired from a steering angle sensor, a vehicle speed sensor, an acceleration sensor, a gyro sensor, etc. mounted in a vehicle.

The driver image data collection unit 212 collects data such as a driver's gaze, eye blinking, pupil diameter, face angle, face position, and expression acquired by a camera attached to a dashboard at a top of a cluster.

A driver biometric data collection unit 213 collects data such as an electrocardiogram, grip strength, respiration, and pulse acquired by a biosensor attached to a steering wheel.

The data collection unit 210 collects control values from the autonomous driving control unit 240.

The data recording and determining unit 220 matches and stores driving-related data collected by the autonomous driving data collection unit 211, driver image and biometric data collected by the driver image data collection unit 212 or the driver biometric data collection unit 213, the control value received from the autonomous driving control unit 240 according to time sequence.

The data recording and determining unit 220 determines the driver's state or emotion according to predefined driver's state or emotion determination criteria.

The driving pattern determining unit 230 performs a learning process using the data stored in the data recording and determining unit 220 and transmits an optimized vehicle control value to the autonomous driving control unit 240.

The driver image data collection unit 212 collects a driver's reaction to the autonomous driving according to the vehicle control value again and updates and stores the autonomous driving data and the control value together.

The driver biometric data collection unit 213 collects a change in driver's state (tension/relaxation, etc.) about the autonomous driving according to the vehicle control value again and updates and stores the autonomous driving data and the control value together.

The driving pattern determining unit 230 determines the autonomous driving control value to approximate the driver's preferred driving pattern by learning the driver image or biometric data, vehicle data, and autonomous driving control value and transmits the determined autonomous driving control value to the autonomous driving control unit 240.

The autonomous driving control unit 240 controls the vehicle using the autonomous driving control value received from the driving pattern determining unit 230.

In this case, when the autonomous driving control value is a value that is greater or less than a safety reference value range, the autonomous driving control unit 240 does not apply the value to the control but applies a safety reference value to perform the autonomous driving control.

Figure 3:
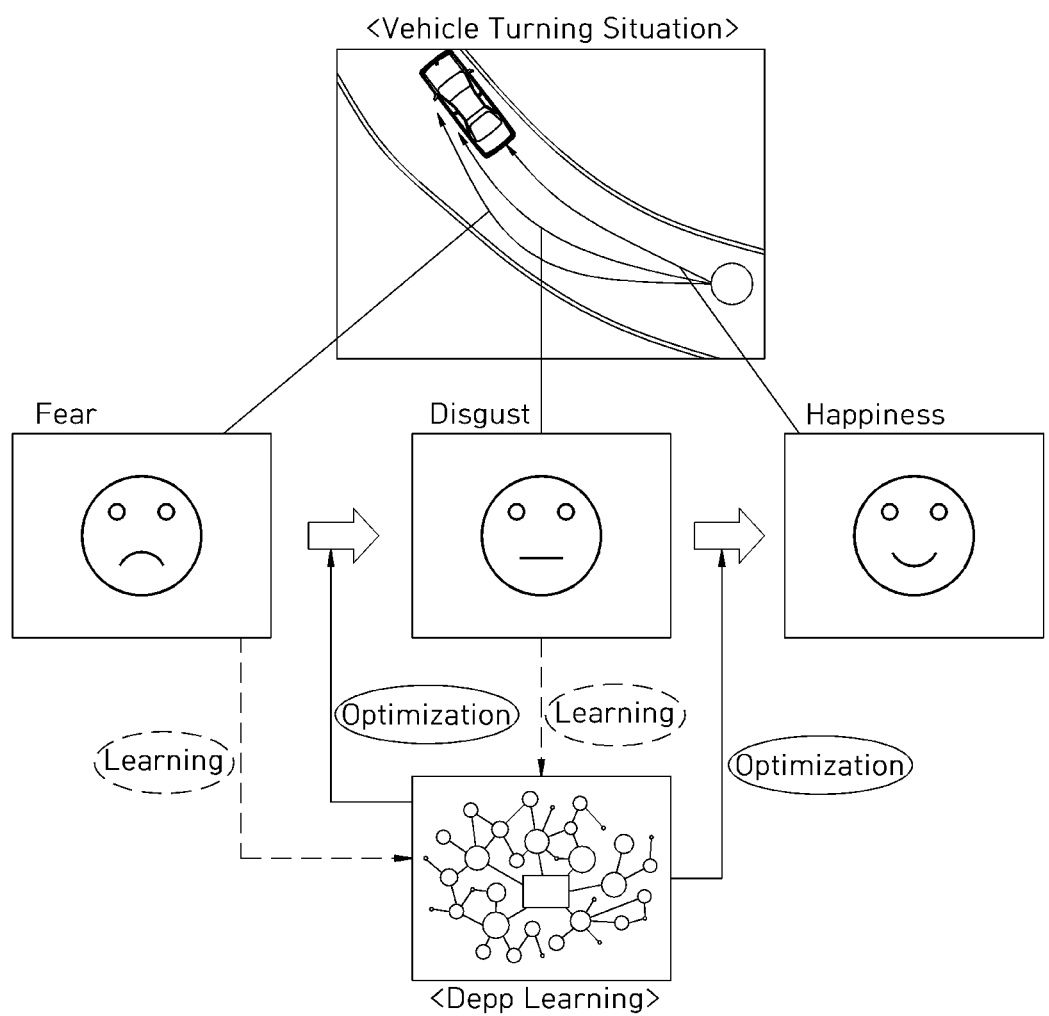
FIG. 3 illustrates autonomous driving improvement in consideration of a driver's state according to an embodiment of the present disclosure.

FIG. 3 illustrates autonomous driving improvement in consideration of a driver's state or emotion according to an embodiment of the present disclosure.

The driver image data (fear and disgust) or biometric data (tension and relaxation) of a driver who feels anxious or unsatisfied with the autonomous driving pattern driven by the initial control value of autonomous driving is collected and learned together with the vehicle data and the control value, and the autonomous driving control value is calculated.

During the autonomous driving according to the calculated autonomous driving control value, the driver's reaction is fed back from the image or biometric data, and the collection, learning, and control procedures are consecutively repeated until the driver's preferred autonomous driving pattern is approached.

As described above, the processor 130 may perform learning by matching the autonomous driving data, the driving situation data, and the driver's state or emotion data according to time sequence and use the learned results to transmit an autonomous driving control command according to the driver's preferred driving pattern.

In addition, the processor 130 includes at least one of a steering wheel control command for a turning radius on a curved road, a vehicle speed control command, an acceleration control command, and a command for maintaining a separation distance from the front vehicle.

Figure 4:
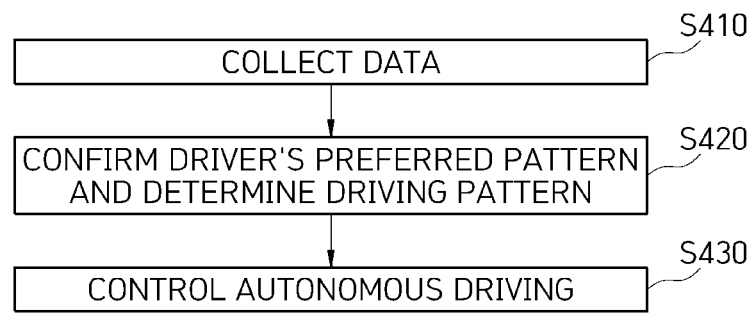
FIG. 4 illustrates a vehicle control method according to an embodiment of the present disclosure.

FIG. 4 illustrates a vehicle control method according to an embodiment of the present disclosure.

A vehicle control method according to the embodiment of the present disclosure includes collecting the driver image and biometric data, the driving-related data, and the autonomous driving control value (S410), determining a driving pattern by confirming a driver preference pattern (S420), and performing the autonomous driving control according to the determined driving pattern (S430).

In operation S410, image data including the driver's expression and facial movement to determine the driver's emotion and biometric data including changes in electrocardiogram, grip strength, respiration, and pulse are collected.

In operation S410, driving-related data including speed, acceleration, yaw, pitch, a roll angle, and a steering angle is collected.

In operation S410, the autonomous driving control values including the longitudinal control data and the lateral control data used for autonomous driving control are collected.

In operation S420, the driving-related data, the driver image or biometric data, and the autonomous driving control values are matched and stored according to the time sequence, and the autonomous driving pattern is determined according to the driver's condition or emotion determination criteria.

In operation S430, the autonomous driving is performed according to the determined autonomous driving pattern, the driver's reaction is collected again, and the autonomous driving control value and the driving-related data are matched and updated.

Second Embodiment

A vehicle control system according to a second embodiment of the present disclosure controls a head-up display (HUD) in consideration of driver's face (head) direction and gaze information, includes an input unit 110 that receives the driver's face orientation and gaze information, a memory 120 that stores a program for determining an HUD information display position using the driver's face orientation and gaze information, and a processor 130 that executes the program, in which the processor 130 determines a gaze point using the driver's face orientation and gaze information and determines a display position to display the HUD information at the gaze point when there is no possibility of overlap with safety-related essential information of the HUD.

The processor 130 monitors the driver's face orientation and gaze information received through the input unit 110 according to time sequence by linking whether there is a front vehicle, the possibility of overlapping a position, or color of a lighting device with an HUD image color with driving information to determine whether the driver's gaze change is a gaze change in situation in which the display position needs to change.

When it is determined that the display position does not need to change, the processor 130 determines that the driver's gaze point is maintained as a front area and maintains the display position.

When it is determined that the display position needs to change, the processor 130 determines that the driver's current field of view is the gaze point and changes the display position so that the HUD information is displayed at the gaze point.

When it is determined that the display position needs to change, the processor 130 determines that the driver's current field of view is the gaze point and changes the display position so that the HUD information is displayed at a position close to the gaze point.

In addition, when the information provided at the changed display position and the color of the surrounding environment at the position that the driver is looking at are similar, since the information transfer effect may be inhibited, the processor secures visibility and readability (readability) by changing a background color of displayed information.

Figure 5A:
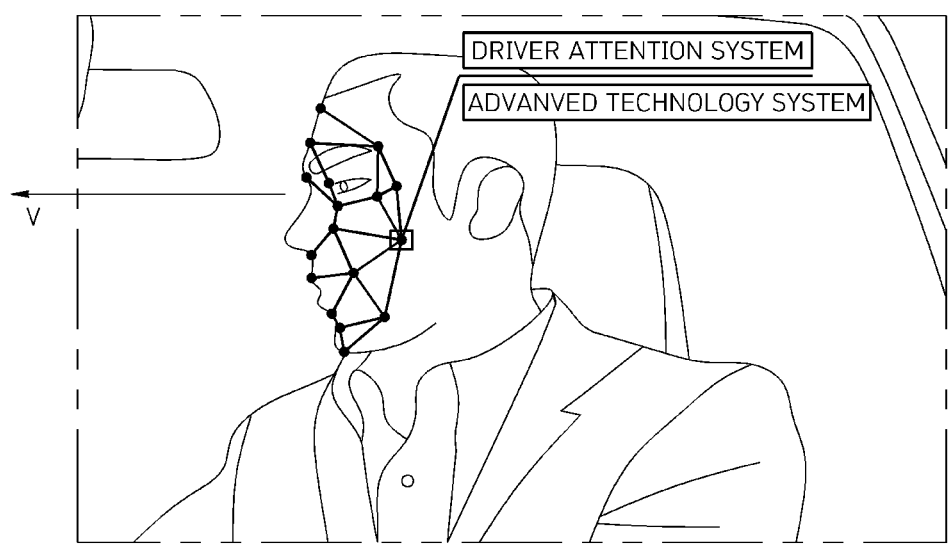
FIG. 5A and FIG. 5B illustrate an example of a change of HUD information display area in consideration of driver's field of view information and a safety-related important information display position on an HUD screen layout according to another embodiment of the present disclosure.
Figure 5B:
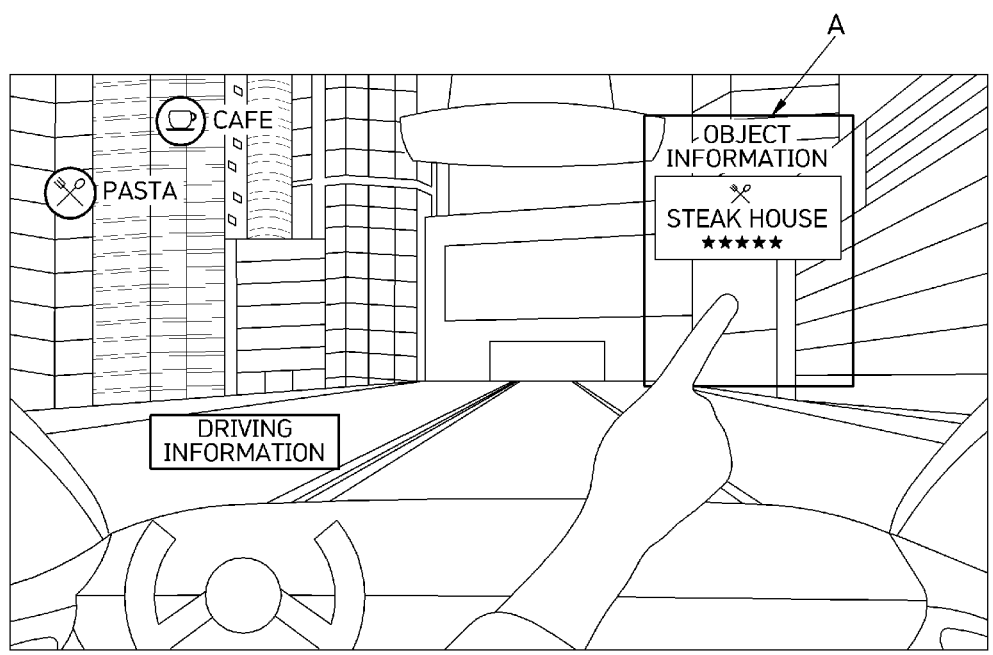

FIG. 5A and FIG. 5B illustrate an example of a change in HUD information display area in consideration of driver's field of view information according to another embodiment of the present disclosure.

Referring to FIG. 5A and FIG. 5B, when the driver's field of view is a V direction and the driver does not look ahead, the HUD information is displayed on right windshield area A in consideration of the driver's field of view.

In this case, by accumulating and monitoring the driver's face orientation and gaze information according to time sequence, the processor 130 determines whether the change in the driver's gaze corresponds to a gaze change in which the HUD information display position is to be changed.

For example, it is assumed that a vehicle traveling on a three-lane road of one-way needs to make a right turn at 100 meters ahead (navigation information is used).

In this case, in the situation where a vehicle enters the rightmost lane and is traveling, when a driver looks at a right area instead of the front at a point where he/she should turn right, this is a gaze change that occurs because the driver has already received navigation information from the HUD information and is ready to turn right (that is, a situation in which the driver's gaze point is changed to prevent accidents that may occur to pedestrians or the like when turning right).

Then, it can be said that a driver is highly likely to look ahead (front) again after making a right turn. When the HUD information display position is changed and displayed in the driver's gaze point area (right side) when making a right turn and the driver's gaze point area (front) is determined after making a right turn again, and the HUD information is displayed in the front area accordingly, the HUD information may be displayed by moving to the area at a later time, which may cause discomfort of a user.

Therefore, according to another embodiment of the present disclosure, instead of simply changing the HUD information display position in consideration of the driver's field of view information, the driving situation information and the driver's gaze change information are monitored, and thus, the HUD information display position can change at the necessary moment.

Conversely, in the above-described example, it is assumed that a vehicle traveling on a three-lane road of one-way needs to make a right turn 100 meters ahead (navigation information is used).

In this case, even though there is not much distance left to make a right turn, when a driver is driving in a second lane and shows no intention to change lanes, such as turning on a right turn signal, the HUD information changes a color, a size, a display method, or the like (for example, displayed in a flickering manner) to inform a driver that a right turn is required according to the navigation information.

In this case, when the driver looks at the right area, it is determined that the driver intends to make a right turn, and as described above, the driver does not change the HUD information display position separately because it is expected that the driver will look ahead again after making a right turn.

As described above, even if the HUD information is provided by changing the display method for more than a certain period of time, when the driver's field of view information does not change (that is, when the driver continues to look ahead), it is determined that the driver intends to drive on a route different from the route guided by the navigation system, and the HUD information is displayed in a normal mode as in the previous method.

When the driver is looking at an object of interest (a nearby building, a new vehicle driving in the next lane, etc.) in a signal waiting situation, the processor changes the HUD information display position to the driver's gaze point.

Through this, when vehicle departure notification and traffic light change notification information are provided through the HUD information, it is possible to increase driving convenience by recognizing the HUD information in which the display position is determined in response to the driver's gaze point even if the driver does not look at the fixed HUD display area.

When the driver's gaze point changes to directions other than forward, the processor 130 provides a convenience function to the driver by using the driver's pupil movement or other body's gestures.

For example, in a signal waiting situation, when the driver is looking at a building where a bakery shop is newly opened and people are lining up, the processor maintains and displays driving-related information in the existing HUD display area, and displays the information of the object by matching the information of the object viewed by the driver to the area of the gaze point (for example, business name, phone number, menu, etc.).

In this case, when the driver blinks his or her eye twice or inputs a hand gesture in the form of a check mark, the processor transmits and stores the information of the object of interest to the device possessed by the user or the device inside the vehicle (for example: OOO bakery registered as a location of interest on OO, OO, 2020, location: OOOO-crossroad, OO, OO-ro, OO-si, Seoul).

In the future, when the location of the object of interest is located on the driver's route, it is possible for the processor to provide a notification to the driver (for example, provide voice notification saying "OOO bakery previously registered as a location of interest is on the way. The main menu OOO will come out at 10 am, 1 pm, and 4 pm, and we will pass by this location around 1:10 pm. When you want to visit OOO Bakery, enter the OK gesture and we will register it as a stopover.").

Figure 6:
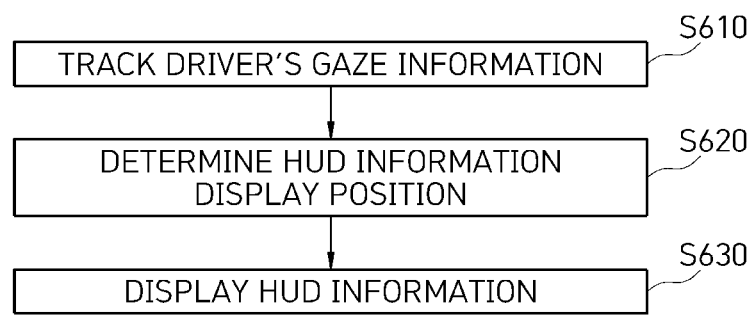
FIG. 6 illustrates a vehicle control method according to another embodiment of the present disclosure.

FIG. 6 illustrates a vehicle control method according to another embodiment of the present disclosure.

A vehicle control method according to another embodiment of the present disclosure includes tracking driver's face orientation and gaze information (S610), determining the HUD information display position using the driver's face orientation and gaze information (S620) and displaying the HUD information according to the determined display position (S630).

In operation S620, it is determined whether it is necessary to change the HUD information display position according to the change in the gaze information by linking and monitoring whether there is a front vehicle, the possibility of overlapping a position or color of a lighting device with an HUD image color, and the change in the face orientation and gaze information with the driving situation.

In operation S620, when it is determined that the driver's gaze point is changed according to the change in the gaze information, the HUD display position is changed so that the area corresponding to the gaze point becomes the HUD information display position.

In operation S620, when the driver's gaze temporarily deviates from the front according to the change in the gaze information but his or her gaze is expected to return to the front according to the driving situation, the HUD information display position is maintained without changing.

In operation S610, the driver's face orientation and gaze information is received from a vehicle internal sensor, such as a driver's eye tracker and a camera sensor.

In this case, in operation S610, the driving information (for example, navigation information) is received along with the driver's face orientation and gaze information, and a process of changing the driver's face orientation and gaze information is monitored.

In operation S620, according to the result of monitoring the process of changing the driver's face orientation and gaze information, it is determined whether the situation according to the change of the driver's gaze point is a situation in which the HUD information display position needs to be changed.

When it is determined in operation S620 that the driver's face orientation and gaze point change situation is not a situation in which the HUD information display position needs to change, in operation S630, the HUD information is continuously displayed to the previously displayed position.

For example, it is assumed that a vehicle traveling on a three-lane road of one-way needs to make a right turn at 100 meters ahead (navigation information is used).

In this case, in the situation where a vehicle enters the rightmost lane and is traveling, when a driver looks a right area instead of the front at a point where he/she should turn right, this is a gaze change that occurs because the driver has already received navigation information from the HUD information and is ready to turn right (that is, a situation in which the driver's gaze point is changed to prevent accidents that may occur to pedestrians or the like when turning right).

Then, it can be said that a driver is highly likely to look ahead (front) again after making a right turn. When the HUD information display position is changed and displayed in the driver's gaze point area (right side) when making a right turn and the driver's gaze point area (front) is determined after making a right turn again, and the HUD information is displayed in the front area accordingly, the HUD information may be displayed by moving to the area at a later time, which may cause discomfort of a user.

On the other hand, in operation S620, when it is determined that the situation in which the driver's face orientation and gaze information changes is to change the HUD information display position, for example, in the signal waiting situation, in the case where the driver does not look at movement of a front vehicle or a traffic light but looks at other locations, in operation S620, it is determined to display the HUD information (for example, front vehicle departure notification and change notification of a traffic light) in the driver's gaze point area, and in operation S630, the HUD information is displayed at the changed display position.

Third Embodiment

A vehicle control system according to another embodiment of the present disclosure includes an input unit 110 that receives driver's state information and illuminance information, a memory 120 that stores a program for determining an HUD display method by using at least one of the driver's state information and the illuminance information, and a processor 130 that executes the program, in which the processor 130 controls to change and display a color or saturation of the HUD information using at least one of the driver's state information and the illuminance information.

The processor 130 controls to change and display hue, saturation, and luminance of a head-up display (HUD) information using RGB color information as well as simple vertical and horizontal illuminance information.

The processor 130 controls to change and display the hue, saturation, and luminance of the HUD information in consideration of the RGB color information (points) or distributions (planes) at a position at which a driver is looking.

The input unit 110 receives state information related to a driver fatigue from a driver monitoring camera, a handle grip pressure sensor, and a heart rate sensor.

The input unit 110 receives illuminance and weather information around a vehicle through a camera sensor outside the vehicle.

In this case, the processor 130 grasps color information using accumulated surrounding information as well as instantaneous surrounding information (headlight light of an oncoming vehicle, surrounding illumination, street light, etc.) received through the input unit 110, and controls to change and display the color, saturation, or luminance of the HUD information.

In addition, the processor 130 can use color, saturation, and luminance change display history information of HUD information received from another vehicle driving ahead along a current driving route to preemptively perform HUD control based on the expected surrounding information based on position information as well as HUD control corresponding to the surrounding information received through the input unit 110.

The input unit 110 processes the illuminance information that affects a driver's field of view in consideration of vehicle's tinting through the in-vehicle camera sensor and transmits the processed illuminance information to the processor.

Since the external strong light gives a strong intensity of stimulus to the driver with high fatigue, the processor 130 controls to change the HUD information to a color with a weak stimulus and to brightness and luminance considering visibility and readability and display the HUD information.

When it is determined that the intensity of external light is stronger than a preset value by analyzing the illuminance information, the processor 130 controls to change the HUD information to change to a color with relatively low saturation and a color with high luminance and display the HUD information.

When it is determined that the driver fatigue is greater than or equal to a preset value and the intensity of external light is greater than or equal to the preset value, the processor 130 controls to lower the saturation of the preset color to a certain level in order to reduce the driver fatigue, and change the HUD information to an appropriate level of luminance and display the HUD information.

The above-described illuminance information includes not only illuminance according to weather but also horizontal plane illuminance and vertical illuminance such as headlight light by an oncoming vehicle and illuminance by a street light.

According to another embodiment of the present disclosure, it is possible to identify a driver's state through a camera and a biosignal device inside the vehicle and display information by correcting the color through the HUD by determining the color, saturation, and luminance suitable for the driver fatigue.

According to another embodiment of the present disclosure, the saturation and luminance of the HUD color are controlled in consideration of the intensity of light flowing into the vehicle according to the illuminance and weather information of the vehicle driving environment.

According to another embodiment of the present disclosure, it is possible to reduce the driver fatigue according to the HUD change display and more accurately support the HUD information.

Figure 7A:
FIG. 7A, FIG. 7B, and FIG. 7C illustrate a concept of HUD control using a driver's state, surrounding information, infrastructure information, and forward situation information according to still another embodiment of the present disclosure.
Figure 7B:
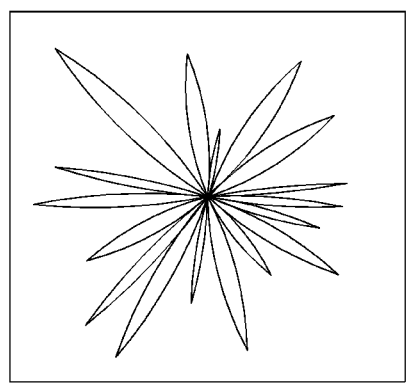
Figure 7C:
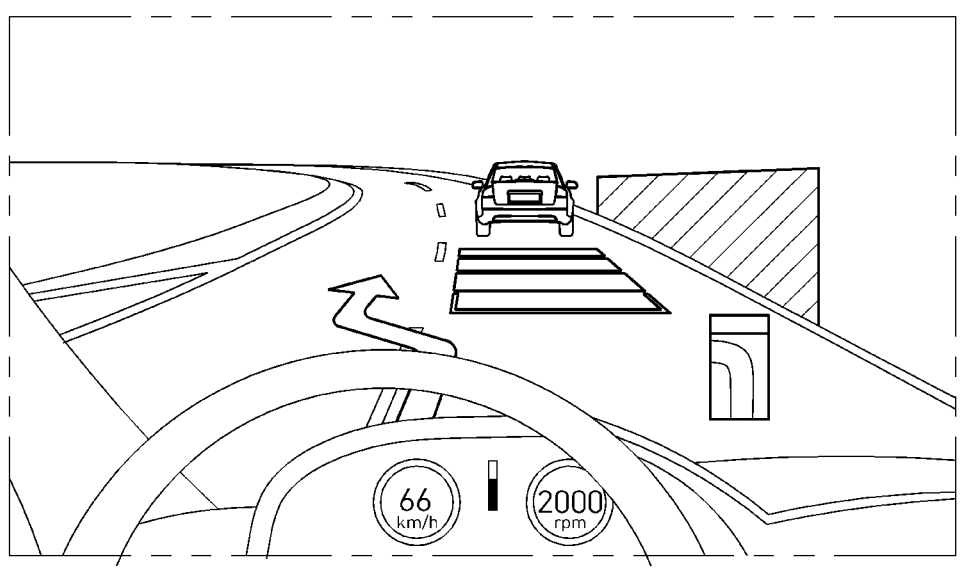

FIG. 7A-FIG. 7C illustrate a concept of the HUD control using the driver's state and the surrounding information according to still another embodiment of the present disclosure.

The processor 130 uses the driver's state information as illustrated in FIG. 7A and uses the illuminance information as illustrated in FIG. 7B to determine the HUD display method as illustrated in FIG. 7C.

As described above, the processor 130 controls to change the HUD information to a color with a weak stimulus to be displayed to a driver with high fatigue, and controls to change the HUD information to a color with a relatively low saturation and an appropriate level of luminance and display the HUD information when it is determined that the intensity of external light (illuminance information including weather, street lights, headlights of an oncoming vehicle, etc.) is stronger than the preset value using the illuminance information.

Figure 8:
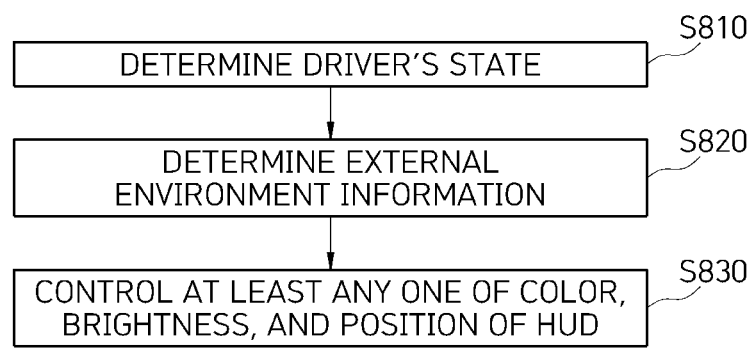
FIG. 8 illustrates a vehicle control method according to yet another embodiment of the present disclosure.

FIG. 8 illustrates a vehicle control method according to yet another embodiment of the present disclosure.

A vehicle control method according to yet another embodiment of the present disclosure includes determining the driver's state (S810), determining the external environment information (S820), and controlling at least any one of the color, brightness, and position of the HUD using at least one of the driver's state and the external environment information (S830).

In operation S810, state information related to a driver fatigue is received from a driver monitoring camera, a handle grip pressure sensor, and a heart rate sensor.

In operation S820, the illuminance and weather information around the vehicle are received through the camera sensor outside the vehicle, and the illuminance information that affects the driver's field of view is processed in consideration of the vehicle's tinting through the camera sensor inside the vehicle to determine the external environment information.

In operation S830, since strong external light gives a strong intensity of stimulus to a driver with high fatigue, the HUD information changes to a color with a weak stimulus and is displayed.

In operation S830, when it is determined that the intensity of external light is stronger than a preset value by analyzing the illuminance information, the HUD information changes to a color with relatively low saturation and is displayed.

In operation S830, when it is determined that the driver fatigue is greater than or equal to a preset value and the intensity of external light is greater than or equal to the preset value, the saturation of the preset color is lowered to a certain level in order to reduce the driver fatigue, and the HUD information changes to an appropriate level of luminance and is displayed.

According to another embodiment of the present disclosure, when it is determined that the intensity of light (refer to horizontal plane illuminance) of a certain portion is stronger than a preset value by analyzing the illuminance information (for example, the situation caused by the headlight of an oncoming vehicle), the driver's face is directed forward, and the HUD information is controlled to be displayed at a position where it is determined that there is relatively little visual fatigue which allows a driver to look at a driving lane as much as possible.

Meanwhile, the vehicle control method according to the embodiment of the present disclosure may be implemented in a computer system or recorded in a recording medium. The computer system may include at least one processor, a memory, a user input device, a data communication bus, a user output device, and storage. Each of the above-described components performs data communication through the data communication bus.

The computer system may further include a network interface coupled to a network. The processor may be a central processing unit (CPU) or a semiconductor device that processes instructions stored in the memory and/or storage.

The memory and storage may include various types of volatile or non-volatile storage media. For example, the memory may include a read only memory (ROM) and a random access memory (RAM).

Accordingly, the vehicle control method according to the embodiment of the present disclosure may be implemented as a computer-executable method. When the vehicle control method according to the embodiment of the present disclosure is performed in a computer device, computer readable instructions may perform the vehicle control method according to the present disclosure.

Meanwhile, the vehicle control method according to the present disclosure described above may be implemented as a computer readable code on a computer-readable recording medium. The computer-readable recording medium includes any type of recording medium in which data readable by a computer system is stored. For example, there may be a ROM, a RAM, a magnetic tape, a magnetic disk, a flash memory, an optical data storage device, and the like. In addition, the computer-readable recording medium may be distributed in computer systems connected through a computer communication network, and stored and executed as readable codes in a distributed manner.

According to the present disclosure, it is possible to resolve discomfort and anxiety of drivers about autonomous driving and to improve drivers' feelings of reliability for the autonomous driving by monitoring drivers' reactions to autonomous driving patterns in real time, calculating autonomous driving patterns optimized for each driver, and performing the autonomous driving accordingly.

It is possible to focus on services provided in various aspects and improve driver's convenience by improving drivers' feelings of reliability for autonomous driving.

In addition, when authentication and cloudization of individual drivers are performed, it is possible to improve driver satisfaction by providing autonomous driving patterns optimized for each driver no matter what autonomous vehicle is used.

According to the present disclosure, it is possible to support intuitive recognition of HUD information even when a driver looks at locations other than the front by moving the HUD information to a driver's gaze point.

According to the present disclosure, it is possible to control HUD information to be changed and displayed so as to reduce the driver fatigue and improve visibility/readability in response to the external environment.

The effects of the present disclosure are not limited to the above-described effects, and other effects that are not mentioned may be obviously understood by those skilled in the art from the following description.

What is claimed is:

1. A vehicle control system comprising:
an input unit including one or more related sensors and configured to collect driving situation data, infrastructure data, forward situation data, and driver's state data;
a memory configured to store a program for determining a driving pattern using the driving situation data, the infrastructure data, the forward situation data, and the driver's state data in a case of an autonomous driving mode; and
a processor configured to execute the program,
wherein the processor is further configured to:
perform learning by matching autonomous driving data with the driving situation data, the infrastructure data, the forward situation data including information of whether a gaze point of a driver overlaps a location of a front vehicle, and the driver's state data;
determine an autonomous driving control pattern based on a result of the learning, and transmit an autonomous driving control command according to the determined autonomous driving control pattern;
obtain a reaction of the driver to an autonomous driving, which is performed based on the autonomous driving control command, by collecting, using an imaging sensor, an image of the driver and collecting, by using a biometric sensor, a change in the driver's state data due to the autonomous driving;
update and store the autonomous driving data based on the obtained reaction of the driver; and
display head-up display (HUD) information on a windshield of a vehicle in an HUD information display position that is aligned with the gaze point of the driver, and
wherein the processor is further configured to, based on the gaze point of the driver being changed:
determine, based on whether navigation information indicating to make a turn within a certain distance from a current position of the vehicle has been provided to the driver, whether a change of the gaze point is a temporary deviation and the gaze point is expected to return to a previous gaze direction after making the turn;
maintain the HUD information display position in response to determining that the change of the gaze point is for making the turn as indicated by the navigation information and thus is the temporary deviation; and
change the HUD information display position to align with the changed gaze point, in response to determining that the change of the gaze point is not for making the turn as indicated by the navigation information and thus is not the temporary deviation,
wherein, in a case of a driver driving mode, the memory stores a second program for determining a head-up display (HUD) control command using the driver's state data including driver's gaze position information and the driving situation data including position and color information of a surrounding object,
wherein the processor executes the second program and transmits the HUD control command in consideration of the color information of the surrounding object displayed in the HUD information display position, and
wherein the processor compares a color of content displayed in the HUD information display position with a color of the surrounding object and transmits the HUD control command for changing at least one of color, luminance, and brightness of a head-up display user interface (HUD UI) and a size of the content in consideration of visibility for each driving time.

2. The vehicle control system of claim 1, wherein the driving situation data includes speed, acceleration, yaw, pitch, and roll information and steering angle and Advanced Driver Assistance Systems (ADAS) information of the vehicle.

3. The vehicle control system of claim 1, wherein the driver's state data includes gaze direction information, eye blink information, pupil diameter information, gaze information, face position information, and expression information of the driver.

4. The vehicle control system of claim 1, wherein the input unit acquires the infrastructure data including information on weather, a pavement condition, and a road structure.

5. The vehicle control system of claim 1, wherein the input unit acquires the forward situation data that includes information on whether the front vehicle is present, and a color and a size of the front vehicle.

6. The vehicle control system of claim 1, wherein the autonomous driving control pattern includes at least one of a steering wheel control command for a turning radius on a curved road, a vehicle speed control command, an acceleration control command, a command for maintaining a separation distance from the front vehicle, and a command for maintaining a lateral separation distance.

7. The vehicle control system of claim 1, wherein, in a case of a driver driving mode, the memory stores a third program for determining a head-up display (HUD) control command by using at least one of the driver's state data related to a driver fatigue and the driving situation data related to illuminance, and
the processor executes the third program and transmits the HUD control command for adjusting a color saturation level and a luminance level of the HUD information when an external light intensity is greater than a preset value.

8. A vehicle control method comprising:
(a) collecting driver's state data, driving situation data, and forward situation data;
(b) in an autonomous driving mode, performing learning by matching autonomous driving data with the driver's state data, the driving situation data, and the forward situation data including information of whether a gaze point of a driver overlaps a location of a front vehicle; and
(c) determining an autonomous driving control pattern based on a result of the learning, and transmitting an autonomous driving control command according to the determined autonomous driving control pattern,
(d) obtaining a reaction of the driver to an autonomous driving, which is performed based on the autonomous driving control command, by collecting, using an imaging sensor, an image of the driver and collecting, by using a biometric sensor, a change in the driver's state data due to the autonomous driving;
(e) updating and storing the autonomous driving data based on the obtained reaction of the driver; and
(f) displaying head-up display (HUD) information on a windshield of a vehicle in an HID HUD information display position that is aligned with the gaze point of the driver, wherein, in operation (f), the method further comprises, based on the gaze point of the driver being changed:
determining, based on whether navigation information indicating to make a turn within a certain distance from a current position of the vehicle has been provided to the driver, whether a change of the gaze point is a temporary deviation and the gaze point is expected to return to a previous gaze direction after making the turn;
maintaining the HUD information display position in response to determining that the change of the gaze point is for making the turn as indicated by the navigation information and thus is the temporary deviation; and
changing the HUD information display position to align with the changed gaze point, in response to determining that the change of the gaze point is not for making the turn as indicated by the navigation information and thus is not the temporary deviation,
wherein the method further comprises, in operation (f):
when the autonomous driving mode is switched to a driver driving mode, acquiring driver's gaze position information and information on a position, a color, and luminance of a surrounding object corresponding to the position;
comparing a color of content displayed in the HUD information display position with the color of the surrounding object displayed in the HUD information display position in the driver's gaze; and
transmitting a HUD control command for changing a color of a head-up display user interface (HUD UI) in consideration of visibility for each driving time.

9. The vehicle control method of claim 8, wherein, in operation (a), the driving situation data includes speed, acceleration, yaw, pitch, and roll information and steering angle and Advanced Driver Assistance Systems (ADAS) information of the vehicle, and the driver's state data includes gaze direction information, eye blink information, pupil diameter information, gaze information, face position information, and expression information of the driver are collected.

10. The vehicle control method of claim 8, wherein, in operation (c), the autonomous driving control pattern includes at least one of a steering wheel control command for a turning radius on a curved road, a vehicle speed control command, an acceleration control command, and a command for maintaining a separation distance from the front vehicle is determined.

11. The vehicle control method of claim 8, further comprising, (g) when the autonomous driving mode is switched to a driver driving mode, determining a head-up display (HUD) control command by using at least one of the driver's state data and the driving situation data.

12. The vehicle control method of claim 8, further comprising, (g) when the autonomous driving mode is switched to a driver driving mode, determining a head-up display (HUD) control command for adjusting a color saturation level and a luminance level of the HUD information when an external light intensity is greater than a preset value.

* * * * *